United States Patent
Li et al.

(10) Patent No.: US 9,838,197 B2
(45) Date of Patent: Dec. 5, 2017

(54) MEMORY MISALIGNMENT CORRECTION

(71) Applicant: NXP B.V., Eindhoven (NL)

(72) Inventors: Juhui Li, Singapore (SG); Ghiath Al-kadi, Gratkorn (AT); Massimo Ciacci, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/094,618

(22) Filed: Apr. 8, 2016

(65) Prior Publication Data

US 2016/0301523 A1 Oct. 13, 2016

(30) Foreign Application Priority Data

Apr. 8, 2015 (EP) ..................................... 15162828

(51) Int. Cl.

| | |
|---|---|
| *H04L 27/22* | (2006.01) |
| *H04L 7/033* | (2006.01) |
| *H04L 27/233* | (2006.01) |
| *H04L 7/00* | (2006.01) |

(52) U.S. Cl.
CPC ............ *H04L 7/033* (2013.01); *H04L 7/0016* (2013.01); *H04L 27/2331* (2013.01)

(58) Field of Classification Search
CPC . H04L 27/22; H04L 27/2332; H04L 27/2059; H04W 56/00
USPC .................. 375/329, 308, 260, 262; 370/350
See application file for complete search history.

(56) References Cited

U.S. PATENT DOCUMENTS

| 6,072,344 | A | 6/2000 | Larsson | |
|---|---|---|---|---|
| 8,804,691 | B1 * | 8/2014 | Zhao | H04L 27/2659 370/350 |
| 2003/0086505 | A1 | 5/2003 | Nguyen et al. | |
| 2007/0071036 | A1 | 3/2007 | Okunev et al. | |
| 2008/0062933 | A1 * | 3/2008 | Liu | H04W 48/12 370/332 |
| 2009/0154627 | A1 * | 6/2009 | Park | H04L 27/2659 375/365 |
| 2012/0269304 | A1 | 10/2012 | Ciacci et al. | |

OTHER PUBLICATIONS

Van De Beek, R. C. H. et al. "A 13.56Mbps PSK Receiver for 13.56MHz RFID Applications", IEEE Radio Frequency Integrated Circuits Symposim, pp. 239-242 (2012).

(Continued)

*Primary Examiner* — Khai Tran

(57) ABSTRACT

A system and module for, and a method of correcting, memory misalignment in a phase shift keying receiver is disclosed. Embodiments include a system having: an analog front end for receiving a demodulated signal having a preamble portion, and for generating a digital register input signal including a received preamble portion; a finite state machine for selecting a memory address of the demodulated signal based on the received preamble portion; a preamble memory for storing all possible preambles contained within the demodulated signal and for supplying a selected preamble memory output corresponding to the selected memory address; and a memory alignment module configured to compare phase information of symbols of the preamble portion and preamble phase information of symbols of the selected preamble memory output. This system checks that the preamble portion of the register input signal aligns with the selected preamble memory output and makes corrections when necessary.

15 Claims, 4 Drawing Sheets

(56) References Cited

OTHER PUBLICATIONS

Seebacher, D. et al. "Measurement Instrument Selection for Very High Bit Rate Contactless Transponder Evaluation", IEEE International Conference on RFID-Technologies and Applications, pp. 140-147 (2011).
"Identification cards—Contactless integrated circuit cards—Proximity cards—Part 2: Radio Frequency power and signal interface—Amendment 5: Bits rates of 3/fc/4 and fc", ISO/IEC 14443-2:2010/PDAM 5, 21 pgs (Jul. 14, 2011).
European Search Report, 15162828.6, dated Sep. 25, 2015.

* cited by examiner

MEMORY MISALIGNMENT CORRECTION

CROSS-REFERENCE TO RELATED APPLICATIONS

This application claims the priority under 35 U.S.C. §119 of European patent application no. 15162828.6, filed on Apr. 8, 2015, the contents of which are incorporated by reference herein.

FIELD

The present disclosure relates to memory misalignment correction. More particularly, the disclosure relates to a system and module for, and a method of memory misalignment correction in, a phase shift keying receiver.

BACKGROUND

Near field communication (NFC) very high bitrate (VHBR) phase shift key (PSK) modulation is typically used for NFC or smart card communication. PSK is a digital modulation scheme that conveys data by changing, or modulating, the phase of a reference signal. Typically a pattern of bits forms a symbol, which is then represented by a particular phase.

A convenient method to represent the phases used in PSK schemes is on a constellation diagram. Such diagrams are a representation of a signal modulated by a digital modulation scheme such as phase-shift keying. A typical constellation diagram shows the phase points in the complex plane with real and imaginary axes representing the in-phase and quadrature axes respectively. The amplitude of each point along the in-phase axis is used to modulate the signal.

In PSK, constellation points chosen are typically aligned with uniform angular spacing around a circle. This provides the maximum phase-separation between adjacent points and also gives the best immunity to corruption. Two common examples are "binary phase-shift keying" (BPSK) which uses two phases, and "quadrature phase-shift keying" (QPSK) which uses four phases, although any number of phases (xPSK) may be used.

As an example, an x Phase shift key modulation may be undertaken, where x is up to 16, using a small segment degree circle to implement the modulation. The segment circle is 60 degrees from −32 degrees to 28 degrees. Due to the very high PSK order typically used, the small circle segment, very high symbol rate and low pass channel characteristics, Automatic Gain Control (AGC) and Channel Estimation are highly required to have an ideal receiving performance.

A typical PSK modulation adopts 140 fixed symbol patterns for AGC and channel estimation, in which 48 symbols are periodic symbols for synchronization and AGC. Because of the very high PSK order—up to 16, and limited circle segment—60 deg, the constellation distances may be as small as 4 degrees. This leads to only a 2 degree noise margin. One issue that may arise from these conditions is misalignment of the memory of the receiver with the transmitted signal.

To save power consumption in smartcard applications, only one sample per symbol is allowed. In typical smartcards, a limiter function is needed to regulate the incoming power. The limiter function acts to destroy the amplitude information as such leading to a phase only receiver. On top of that, the system sometimes needs to operate in highly de-tuned cases.

Misalignment may also occur in other devices, such as for Near Field Communication (NFC) receivers. NFC receivers typically employ In-phase Quadrature (IQ) receivers. Misalignment may also occur for such systems and receivers due to the use of an analog mixer, which results in a delay between the in-phase or quadrature signals.

In a real application case, such as for a smartcard system or for NFC devices, all of these factors may easily cause the receiver to become out of phase with the transmitter, even during a preamble period. Accordingly, AGC and Channel Estimation after this point will be completely misaligned. The most common case of an out of phase receiver/transmitter arrangement is a 1 symbol misalignment between the receiver and transmitter. This is generally due to a misdetection of the first symbol as the low pass channel settles down.

A typical way to correct the misalignment in this type of communication system is to calculate the pattern of the received signal power. In particular, this information may be found in the initial preamble and then periodically as a reinserted preamble. As an example, in one communication system, the symbols may have values of 24, −24, 24, −24 or 28, −28, 28, −28 degrees. This pattern detection involves intensive computation with associated hardware cost and high power consumption and is also an error prone implementation due to the power threshold selection and memory address fix calculation mechanism. This disclosure is trying to utilize preamble pattern specialty and proposes a phase variance trend detection technique and module to detect and correct any detected misalignment.

SUMMARY

According to a first aspect of the present disclosure there is provided a system for a phase shift keying receiver, said system comprising an analog front end for receiving an analog demodulated signal having a preamble portion and for generating a digital register input signal including a received preamble portion comprising a number of symbols, each symbol having phase information; a finite state machine for selecting a memory address of the demodulated signal based on a value of the symbols of the received preamble portion; a preamble memory for storing all possible preambles contained within the demodulated signal and for supplying a selected preamble memory output corresponding to the selected memory address and comprising a number of symbols, each symbol having preamble phase information; and a memory alignment module configured to compare the phase information of the symbols of the preamble portion and the preamble phase information of the symbols of the selected preamble memory output to check that the preamble portion of the register input signal aligns with the selected preamble memory output.

The phase information and the preamble phase information may be a phase variance trend of the symbols of the preamble portion and the preamble memory output respectively. In an example, this may include how the phase varies between adjacent symbols. In another example the phase information and the preamble phase information may be a phase status, such as positive, negative or zero. A combination of these may also be used. The system typically uses pattern trend detection to detect and fix preamble memory output and the analog front end output misalignment. This may be used in smartcard VHBR PSK communication and NFC VHBR PSK communication. Compared to normal pattern matching schemes, this provides a simpler and more hardware efficient technique. This reduces hardware cost and power consumption, which may be crucial in some smartcard applications and NFC applications.

In embodiments the memory alignment module may be configured to compare the phase information of the symbols of the preamble portion with the preamble phase information by determining and comparing a phase variance trend and/or a phase status of at least two symbols and preferably four symbols of the preamble portion with the phase variance trend and/or a phase status of a corresponding at least two symbols and preferably four symbols of the selected preamble memory output. More than four symbols may be compared. Additionally, as noted above, the phase status may be a positive, negative or zero status of the phase.

The memory alignment module may directly compare the phase information between symbols of the preamble portion and the phase information between corresponding symbols of the selected preamble memory output. It may be appreciated that the phase variance and/or phase status may be the phase information or preamble phase information being directly compared. By directly comparing the phase information and the preamble phase information, the time and resources used by the system to check that the preamble memory output has been correctly generated is reduced compared to traditional power management analysis.

The memory alignment module may provide a memory alignment signal to the finite state machine if the phase information of symbols of the preamble portion and the preamble phase information of symbols of the selected preamble memory output do not match. Again, the phase variance and/or phase status may be the phase information.

The memory alignment signal may provide information about any misalignment between the phase information of the preamble portion and the preamble phase information of the selected preamble memory output to allow generation of a corrected preamble memory output.

The memory alignment signal may provide information about the type of correction required to align the phase information of the selected preamble memory output and the preamble phase information of the preamble portion.

According to a second aspect of the present disclosure, there is provided a memory alignment module for a phase shift keying receiver, said module comprising: a comparator for receiving a register input signal having a preamble portion, wherein the comparator is configured to directly compare a phase value of received symbols of the preamble portion with the a phase value of the previously received symbol of the preamble portion to determine phase information of the preamble portion; an index comparator for receiving a preamble memory output with a memory address, wherein the index comparator is configured to directly compare a phase value of received symbols of the preamble memory output with a phase value of the previously received symbol of the preamble memory output to determine the preamble phase information of the preamble memory output; and an alignment comparator configured to compare the phase information and the preamble phase information to determine if they are aligned.

The module typically uses pattern trend detection to detect and fix preamble memory output and the analog front end output misalignment. This may be used in smartcard VHBR PSK communication and NFC VHBR PSK communication. Compared to normal pattern matching schemes, this provides a simpler and more hardware efficient technique. This reduces hardware cost and power consumption, which may be crucial in some smartcard applications and NFC applications.

The phase information and the preamble phase information may be a phase variance trend of the symbols of the preamble portion and the preamble memory output respectively. In an example, this may include how the phase varies between adjacent symbols. In another example the phase information and the preamble phase information may be a phase status, such as positive, negative or zero. A combination of these may also be used. The comparator is then configured to determine if the phase trends or phase statuses are aligned or match.

In embodiments the phase information and preamble phase information may be the phase variance trend and/or the phase status whereby the module may compare the phase variance trend and/or phase status of at least two symbols of the preamble portion, which may then be compared with the phase variance trend and/or phase status of at least two symbols of the preamble memory output.

The module may be configured to generate a memory alignment signal if the phase information and the preamble phase information are not aligned. Accordingly, the alignment comparator may be configured to generate an address control signal if the phase information and the preamble phase information do not align. The module may also further comprise an address control module configured to receive the address control signal and configured to determine an actual memory address of the preamble portion. Furthermore, the module may further comprise an address comparator configured to directly compare the actual memory address of the preamble portion with the memory address of the preamble memory output. In some cases, the address comparator may be configured to generate the memory alignment signal if the actual memory address of the preamble portion and the memory address of the preamble memory output are misaligned; and provide the memory alignment signal to a finite state machine so that the preamble memory output can be corrected.

In complimentary embodiments, the memory address of the preamble memory output may be selected based on the initially received preamble portion of the register input signal.

According to a third aspect of the present disclosure, there is provided a method of correcting memory misalignment in a phase shift keying receiver, said method comprising the steps of: receiving an analog demodulated signal having a preamble portion; generating a corresponding digital register input signal with a received preamble portion having phase information; selecting a memory address of the demodulated signal based on the received preamble portion; determining a preamble memory output having preamble phase information based on the memory address from a database of all possible preambles contained within the demodulated signal; and comparing phase information of the preamble portion and the preamble phase information of the selected preamble memory output to check that the preamble memory output has been correctly generated.

The method typically uses pattern trend detection to detect and fix preamble memory output and the analog front end output misalignment. This may be used in smartcard VHBR PSK communication and NFC VHBR PSK communication. Compared to normal pattern matching schemes, this provides a simpler and more hardware efficient technique. This reduces hardware cost and power consumption, which may be crucial in some smartcard applications.

The phase information and the preamble phase information may be a phase variance trend of the symbols of the preamble portion and the preamble memory output respectively. In an example, this may include how the phase varies between adjacent symbols. In another example the phase information and the preamble phase information may be a phase status, such as positive, negative or zero. A combination of these may also be used. The comparator is then configured to determine if the phase trends or phase statuses are aligned or match.

The memory may be read only memory (ROM), such that ROM addresses and preamble ROM outputs are provided and ROM alignment signals are provided.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), RAM, as non-limiting examples. The software implementation may be an assembly program.

The computer program may be provided on a computer readable medium, which may be a physical computer readable medium, such as a disc or a memory device, or may be embodied as a transient signal. Such a transient signal may be a network download, including an internet download.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
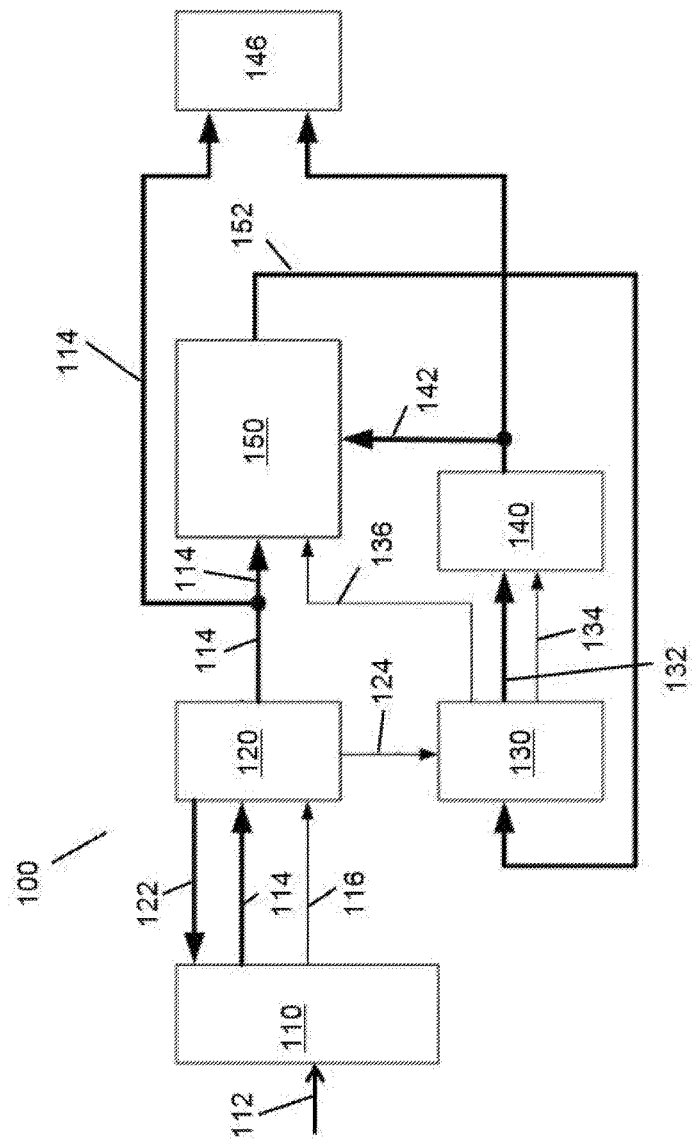
FIG. 1 illustrates a simplified system architecture diagram with a register input and a selected preamble according to the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 shows a simplified system architecture diagram. In this figure, a system 100 contains an analog front end (AFE) 110 that receives or removes an analog carrier signal 112 and generates a digital register input signal 114 at a sampling clock 116. A timing detector 120 chooses the right sampling point and time and instructs the AFE 110 to output one sample or more samples of the register input signal 114 per symbol via a command signal 122. The timing of the outputs is typically optimised for power saving.

A finite state machine (FSM) 130 controls all of the system and ensures that commands are undertaken in a time by time manner. A preamble memory, such as read only memory (ROM), EPROM, EEROM or RAM 140 stores all possible fixed pre-amble patterns that the carrier signal 112 may contain. These fixed pre-amble patterns are then fed into an AGC and/or channel estimator 146. The AGC and/or channel estimator 146 receivers the AFE output 114 either directly from the AFE 110 or via the timing detector 120 and estimates the gain and channel characteristics.

Once the timing detector 120 detects the first symbol from the preamble of the carrier signal 112, the FSM is alerted via a detect signal 124. The FSM determines the memory address by analysing the preamble signal and supplies this to the preamble memory 140 via an output memory address signal 132 and provides a signal 134 to enable the preamble memory 140. On receipt of the signal 134, the preamble memory 140 supplies the selected preamble memory output 142 corresponding to the output memory address 132.

A memory misalignment detection and correction module 150 is provided to detect a symbol misalignment by processing the register input signal 114 and the selected preamble memory output 142. The memory misalignment detection and correction module 150 is enabled by a misalignment module signal 136 from the FSM. As will be described in further detail below with respect to FIG. 2, the detection and correction module detects possible misalignment between the register input signal 114 and the selected preamble memory output 142 and calculates whether an adjustment to the memory address is necessary. If adjustment is required, this is provided to the finite state machine 130 via a memory address alignment signal 152. The FSM 130 then corrects its output memory address 132. This 142 may also go directly to control 140. Accordingly, the preamble memory output 142 may be aligned with the AFE output (the register input signal 114.).

Figure 2:
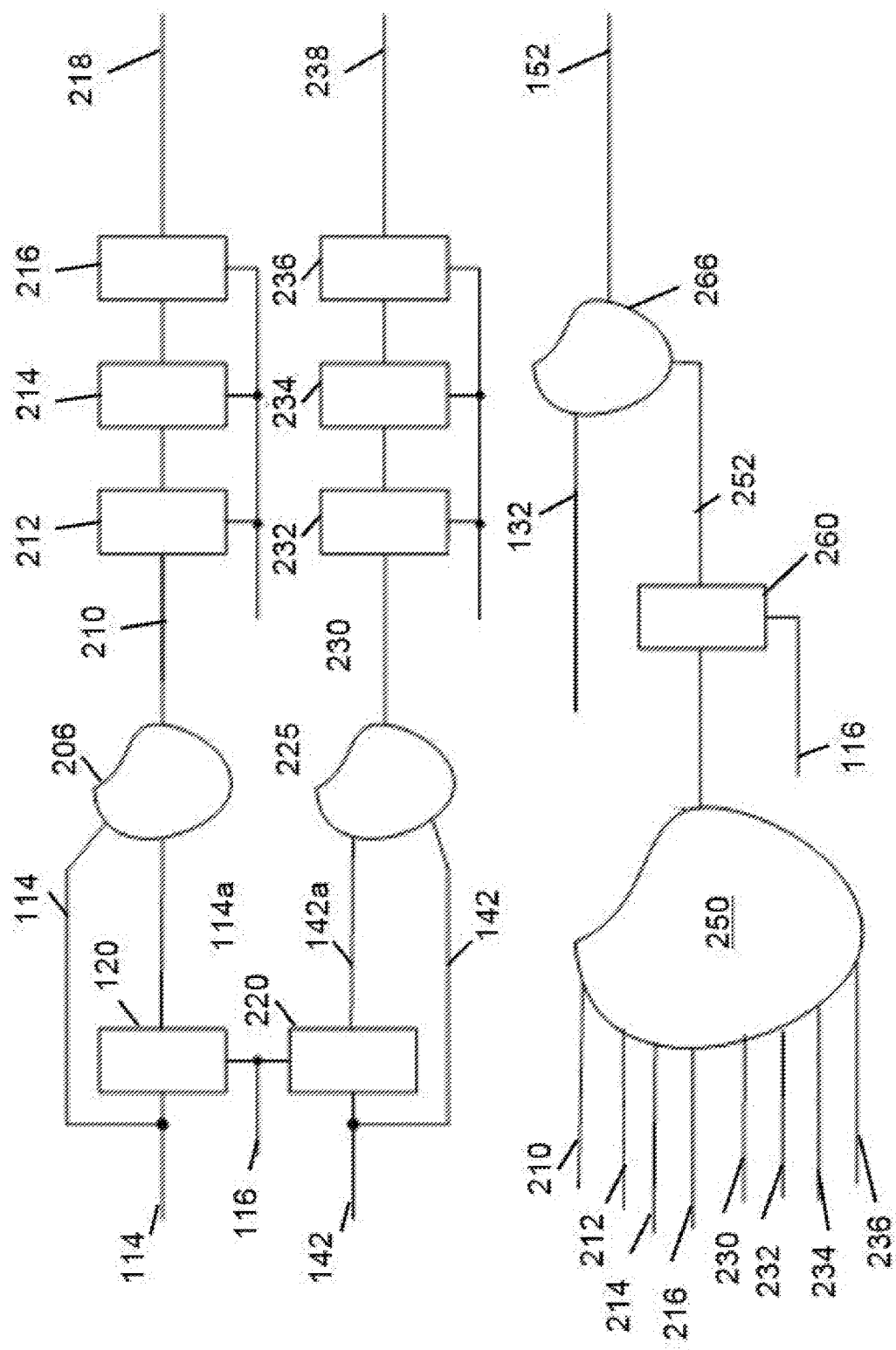
FIG. 2 illustrates a more detailed system architecture diagram of portions of the system shown in FIG. 1.

FIG. 2 shows the 150 in more detail. The register input signal 114 is fed into the timing module 120 as described previously. Upon receipt of a clock signal 116, the phase of the present symbol 114 is compared to the phase of the previous symbol 114a of the register input signal 114 to determine whether the phase of the register input signal is rising or falling between those two symbols. In other words, the trend of the register input signal is analyzed by comparing the phase of a current symbol with the phase of the previous symbol.

As described above, the previous symbol 114a is compared to the original register input signal 114 at comparator 206. The comparison result 210 is obtained and stored as sample trends 212, 214, 216. The sample trends 212, 214, 216 are then provided by a register input phase trend signal 218 to perform the memory misalignment detection and correction in 250. It should be noted that instead of phase trends, phase status such as positive, negative, or zero may also be detected alone or together with phase trend in block 150.

A similar process occurs for the preamble memory output 142. The selected preamble memory output 142a is delayed by a register 220 at intervals according to the sampling clock signal 116. The selected preamble memory output 142a is compared by index comparator 225 to the latest preamble memory output 142. In a similar manner as described above, the trend of the phases of the adjacent preamble symbols are stored as index trends 232, 234, 236. The index trends are then taken memory by the memory misalignment detection and correction module in 250.

In the memory misalignment detection and correction module 250 the sample trends 210, 212, 214, 216 and the index trends 230, 232, 234, 236 are processed by module 250 which undertakes a direct comparison between the trend of the sampled phases of the samples and the trend of the preamble samples (i.e. the variation in the phase values of sample trends 210, 212, 214, 216 of the register input signal 114 is compared to the variation in phase of index trends 230, 232, 234, 236 of the selected preamble memory output 142 in a similar manner to that shown in Table 1 below). It may be appreciated that the information of the phase trends may be compared from phase trend signals 218, 238 instead of the individual samples. If a discrepancy in the trend of the variations is determined, the memory misalignment detection and correction module 250 provides an address control signal 252 to an address control module 260, which may be within the FSM 130, which is sampled according to the clock signal 116 to provide the actual memory address of the preamble portion of the preamble memory output 142, which may be considered to be the control address 252. This control address 252 is then provided to an address comparator 266 that compares the control address 252 with the memory address 132. If a discrepancy is detected, the memory addresses 132 are aligned to the control address 252 via a memory address alignment signal 152.

The memory misalignment detection and correction module 150 is configured to take in one or more adjacent samples (one or more samples per symbol) and detect the going up or going down of the samples to recognize the trend pattern. As an example, if the phase of the first symbol is 24 and the phase of the second symbol is −24, then this is a going down trend and is noted as a "−". Conversely, −24 for the phase of the first symbol and 24 for the phase of the second symbol is a going up trend and is noted as "+". When the preamble for the PSK communication mode is known, a comparison between the detected preamble pattern and the expected preamble pattern may be made to determine misalignment. For example, in VHBR 8PSK communication the fixed preamble is 24, 24, −24, −24, 24, 24, −24, −24 . . . , 24, 24, −24, −24, 24, −24, 24, −24, 32, 32, −24 . . . . The pattern before 24, −24, 24, −24 is a periodic pattern and after 24, −24, 24, −24 is a random pattern. The preamble in VHBR 16PSK is similar but with different degree values and patterns, such as, 28, 28, —28, −28, 28, 28, −28, −28 . . . , 28, 28, —28, −28, 28, −28, 28, −28, 32, 32, −28 . . . . Unlike conventional techniques for detecting this pattern that analyzes power calculation, instead the trend curve "+−+−" is detected.

Figure 3:
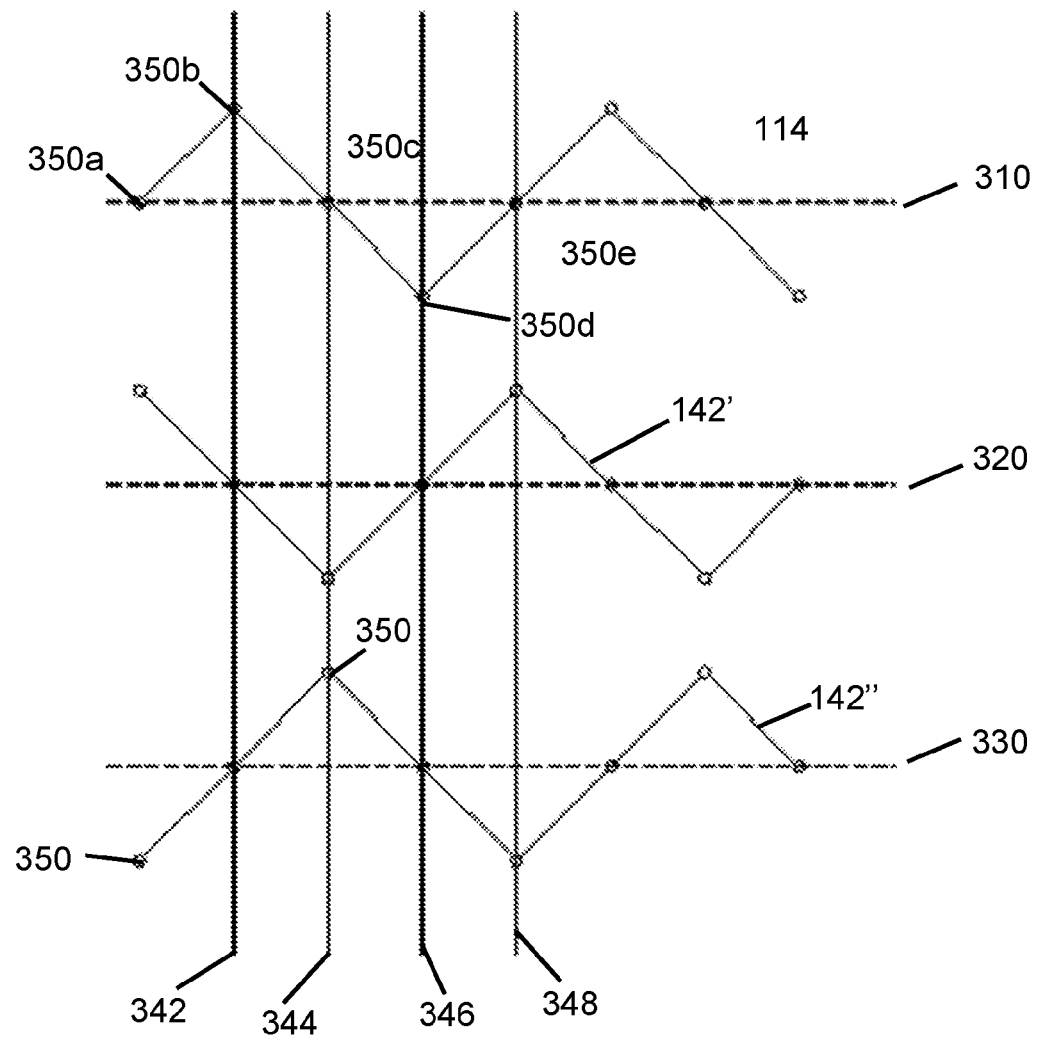
FIG. 3 shows a comparison between the received phases of a register input and fast and slow preambles.

FIG. 3 shows a possible case of misalignment between the selected preamble memory output 142 memory output and the register input signal 114. The top waveform 310 is the waveform of the register input signal 114. If a selected preamble memory output 142' is one symbol faster than the register input signal 114, it is shown in the middle waveform 320. If a selected preamble memory output 142" is one symbol slower, it is shown in the bottom waveform 330. In each of these situations, there are 4 cases 342, 344, 346, 348 to be considered depending on the start point of the first detected sample 350.

By analyzing the detected sample 350 and the trend pattern between samples the corrective action necessary for each misalignment case may be determined and applied. An example of the action needed for each case is shown in Table 1.

For example, for case 342, sample 350b is analyzed and the trend from sample 350a determined to be a positive change in the value of the phase from sample 350a to sample 350b. This is indicated by a "+". Between sample 350b and 350c, the phase is negative, indicated by a "−". Continuing the analysis between samples 350c and 350d and 350d and 350e yields "−+". A direct comparison between this variation and the variation in the selected preamble memory output 142 that corresponded to the preamble of the memory address 132 is then made. It may be seen from a comparison between corresponding points of curves 310 and 320/330 that the preamble may be fast or slow (or it may be aligned). The options are shown in Table 1, together with the trend adjustment required to align the selected preamble memory output 142 to the register input signal 114.

TABLE 1

| Register input | | +−−+ | −−++ | −++− | ++−− | Trend adjustment required |
|---|---|---|---|---|---|---|
| preamble | Fast | −−++ | −++− | ++−− | +−−+ | −1 |
| | Slow | ++−− | +−−+ | −−++ | −++− | +1 |
| | aligned | +−−+ | −−++ | −++− | ++−− | +0 |

It is important to note that the system is not doing any pattern correlation between the register input signal 114 and preambles memory output 142. Instead the system detects only the trend of the register input signal 114 individually and the trend of the selected preamble memory output 142 individually. Each of these trends is classified using the "+" and "−" notation described earlier.

As noted above, the trends of four samples are compared with Table 1. Different correction action is taken according to the table. As noted above, the major implementation of memory alignment is shown in FIG. 2.

As an alternative, it may be noted from FIG. 3 that instead of detecting "+−+−", i.e. 4 patterns, it is possible to detect "+−", "+−+−+−" or more, so 2 or more patterns. This reduced pattern detection works at least in the VHBR PSK case. This may be considered an implementation optimization of this misalignment detection and correction. Accordingly, instead of utilizing the 24, −24, 24, −24 or the 28, −28, 28, −28 pattern in the example above, by detecting the periodic pattern 24, 24, −24, −24 or 28, 28, −28, −28 this also allows a similar comparison. Additionally, although described above to detect and correct one symbol misalignment, it is also possible to utilize the periodic pattern and the synchronization pattern together, to detect the misalignment of two or more symbols. As an alternative, it may also be noted that instead of detecting the phase variance trend of samples, detecting the absolute positive, negative or zero of a few samples may also implement the similar functions.

Figure 4:
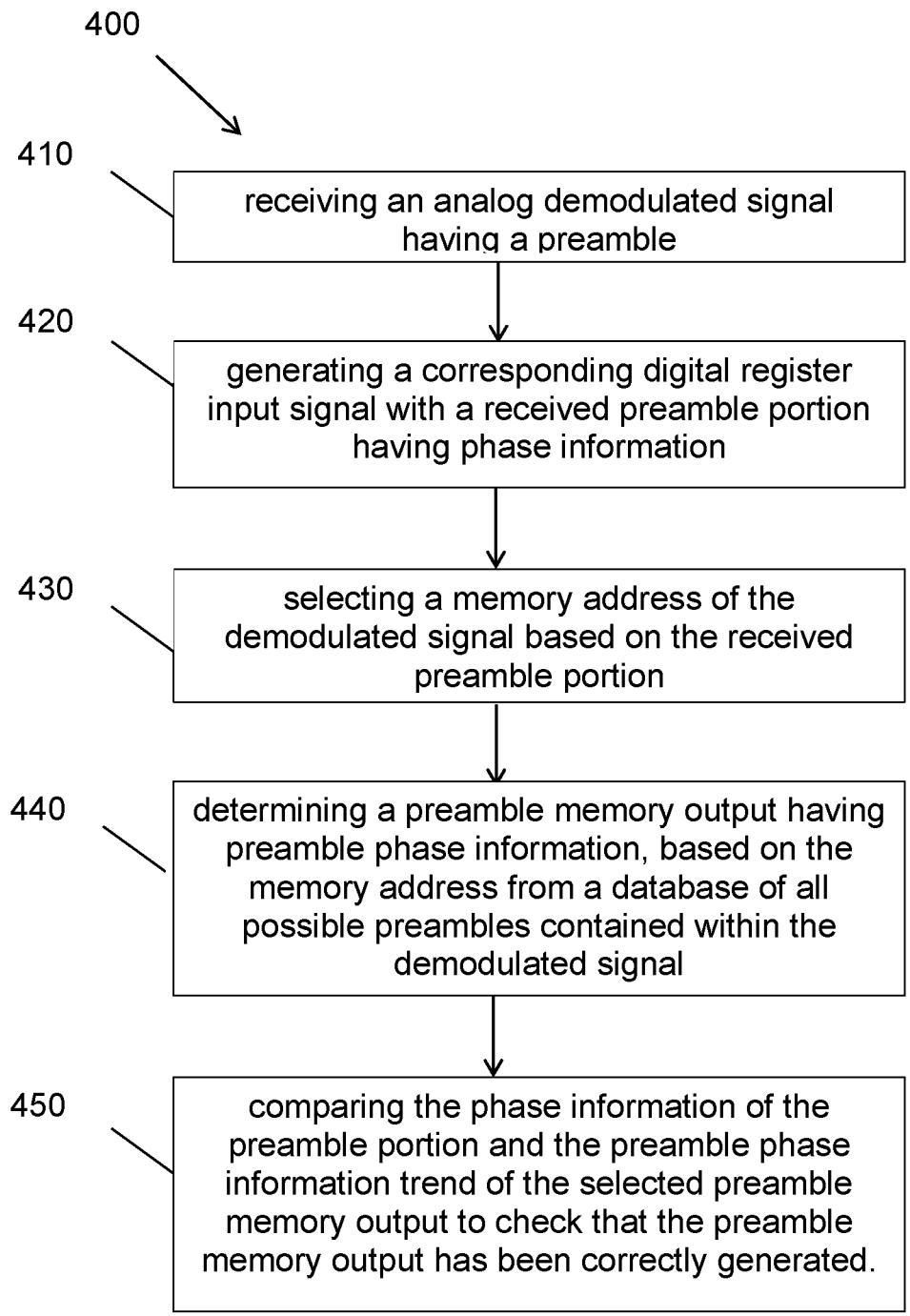
FIG. 4 shows a method of undertaking memory alignment according to the present disclosure.

FIG. 4 shows a method 400 of correcting memory misalignment in a phase shift keying receiver, such as a smart-card of NFC device. The method comprises the first step of receiving 410 the analog demodulated signal 112 having a preamble portion. The analog demodulated signal 112 is used to generate 420 a corresponding digital register input signal 114 having a number of symbols and with a received preamble portion having phase information. A memory address is then selected 430 for the received demodulated signal 114 based on the received preamble portion. The method then determines 440 a preamble memory output 142 having preamble phase information based on the memory address from a database of all possible preambles contained within the demodulated signal 142 before comparing 450 the phase information, which is typically the phase variance trend or the status such as positive, negative, or zero of the phase of the preamble portion, and the phase variance trend or the status such as positive, negative, or zero of the phase of the selected preamble memory output 142 to check that the preamble memory output 142 has been correctly generated.

From reading the present disclosure, other variations and modifications will be apparent to the skilled person. Such variations and modifications may involve equivalent and other features which are already known in the art of phase shift keying, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A system for a phase shift keying receiver, said system comprising:
   an analog front end for receiving an analog demodulated signal having a preamble portion and for generating a digital register input signal including a received preamble portion and comprising a number of symbols, each symbol having phase information;
   a finite state machine for selecting a memory address of the demodulated signal based on a value of the symbols of the received preamble portion;
   a preamble memory for storing all possible preambles contained within the demodulated signal and for supplying a selected preamble memory output corresponding to the selected memory address and comprising a number of symbols, each symbol having preamble phase information; and
   a memory alignment module configured to compare the phase information of the symbols of the preamble portion with the preamble phase information to check that the preamble portion of the register input signal aligns with the selected preamble memory output.

2. The system of claim 1, wherein the memory alignment module is configured to compare the phase information of the symbols of the preamble portion with the preamble phase information by determining and comparing a phase variance trend and/or a phase status of at least two symbols and preferably four symbols of the preamble portion with the phase variance trend and/or a phase status of a corresponding at least two symbols and preferably four symbols of the selected preamble memory output.

3. The system of claim 1, wherein the memory alignment module directly compares the phase information between symbols of the preamble portion of two or more received symbols and the preamble phase information between corresponding symbols of two or more received symbols of the selected preamble memory output.

4. The system of claim 1, wherein the memory alignment module provides a memory alignment signal to the finite state machine if the phase information of symbols of the preamble portion and the preamble phase information of symbols of the selected preamble memory output do not match.

5. The system of claim 4, wherein the memory alignment signal provides information about any misalignment between the phase information of the preamble portion and the preamble phase information of the selected preamble memory output to allow generation of a corrected preamble memory output.

6. The system of claim 4, wherein the memory alignment signal provides information about the type of correction required to align the phase information of the preamble portion and the preamble phase information of the selected preamble memory output.

7. A memory alignment module for a phase shift keying receiver, said module comprising:
   a comparator for receiving a register input signal having a preamble portion, wherein the comparator is configured to directly compare a phase value of received symbols of the preamble portion with a phase value of the previously received symbol of the preamble portion to determine phase information of the preamble portion;
   an index comparator for receiving a preamble memory output with a memory address, wherein the index comparator is configured to directly compare a phase value of received symbols of the preamble memory output with a phase value of the previously received symbol of the preamble memory output to determine preamble phase information of the preamble memory output; and
   an alignment comparator configured to compare the phase information and the preamble phase information to determine if they are aligned.

8. The module of claim 7, wherein the phase information is the phase variance trend of two or more symbols of the preamble portion and/or the phase status of two or more received symbols of the preamble portion and the preamble phase information is the phase variance trend two or more symbols of the preamble memory output and/or the phase status of two or more preamble memory outputs.

9. The module of claim 7, wherein the module is configured to generate a memory alignment signal if the phase information and the preamble phase information do not align.

10. The module of claim 9, wherein the alignment comparator is configured to generate an address control signal if the phase information and the preamble phase information do not align.

11. The module of claim 10, wherein the module further comprises an address control module configured to receive the address control signal and configured to determine an actual memory address of the preamble portion.

12. The module of claim 11, wherein the module further comprises an address comparator configured to directly compare the actual memory address of the preamble portion with the memory address of the preamble memory output.

13. The module of claim 12, wherein the address comparator is configured to:
   generate the memory alignment signal if the actual memory address of the preamble portion and the memory address of the preamble memory output are misaligned; and
   provide the memory alignment signal to a finite state machine so that the preamble memory output can be corrected.

14. The module of claim 7, wherein the memory address of the preamble memory output is selected based on the initially received preamble portion of the register input signal.

15. A method of correcting memory misalignment in a phase shift keying receiver, said method comprising the steps of:
- receiving an analog demodulated signal having a preamble portion;
- generating a corresponding digital register input signal with a received preamble portion having phase information;
- selecting a memory address of the demodulated signal based on the received preamble portion;
- determining a preamble memory output having preamble phase information, based on the memory address from a database of all possible preambles contained within the demodulated signal; and
- comparing the phase information of the preamble portion and the preamble phase information trend of the selected preamble memory output to check that the preamble memory output has been correctly generated.

* * * * *